Feb. 12, 1929.

F. HICKOK 1,702,209

THERMOSTATIC DEVICE FOR INCUBATORS AND OTHER APPARATUS

Filed April 23, 1925 2 Sheets-Sheet 1

Inventor
Frank Hickok
By John S. Barker
Attorney

Feb. 12, 1929.
F. HICKOK
1,702,209
THERMOSTATIC DEVICE FOR INCUBATORS AND OTHER APPARATUS
Filed April 23, 1925      2 Sheets-Sheet 2
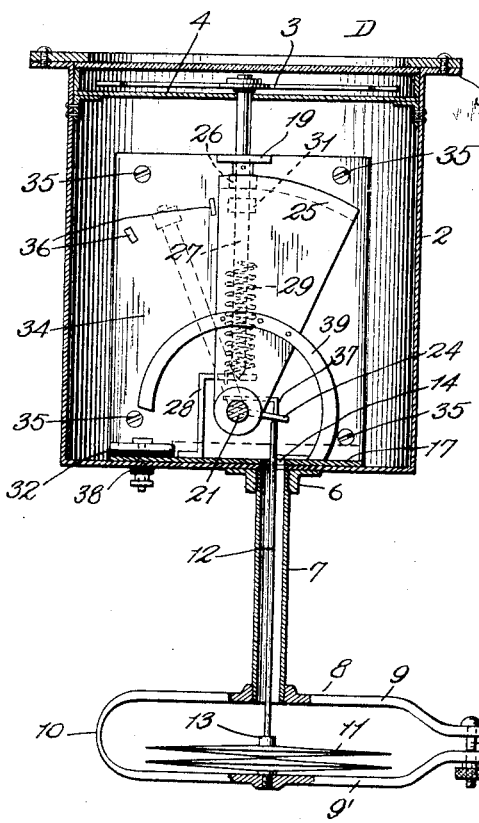
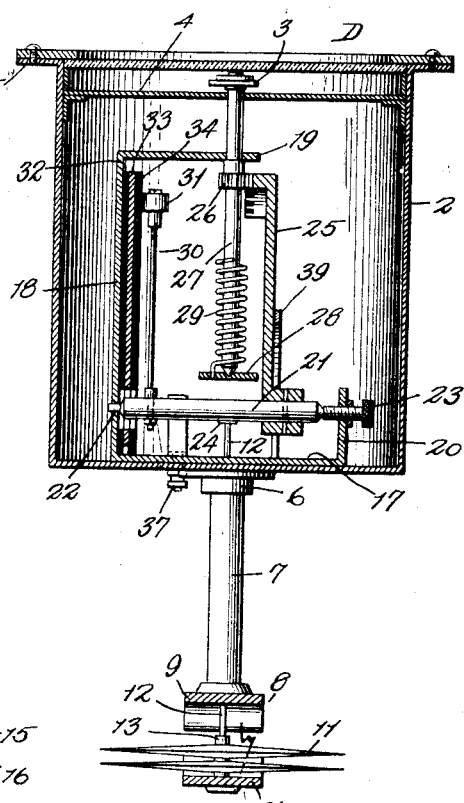
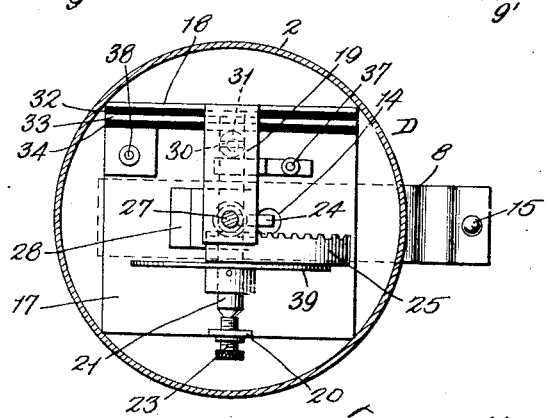
Inventor
Frank Hickok
By John S. Barker
Attorney Patented Feb. 12, 1929.

1,702,209

UNITED STATES PATENT OFFICE.

FRANK HICKOK, OF CARTHAGE, MISSOURI.

THERMOSTATIC DEVICE FOR INCUBATORS AND OTHER APPARATUS.

Application filed April 23, 1925. Serial No. 25,329.

My invention relates to thermostatic apparatus adapted to be used in connection with incubators. It has for its object to improve the apparatus as will be hereinafter pointed out. While that embodiment of the invention which I shall describe has been devised with especial reference to being used in connection with an incubator for controlling an electric alarm, I wish it to be understood that the invention is not limited in its applications to that particular use, or to the specific embodiment of the invention illustrated, or beyond the limitations of the claims with which this specification closes.

Figs. 3 and 4 are vertical sectional views of the apparatus taken on planes at right angles to each other.

Fig. 5 is a horizontal sectional view through the apparatus.

Figure 1:
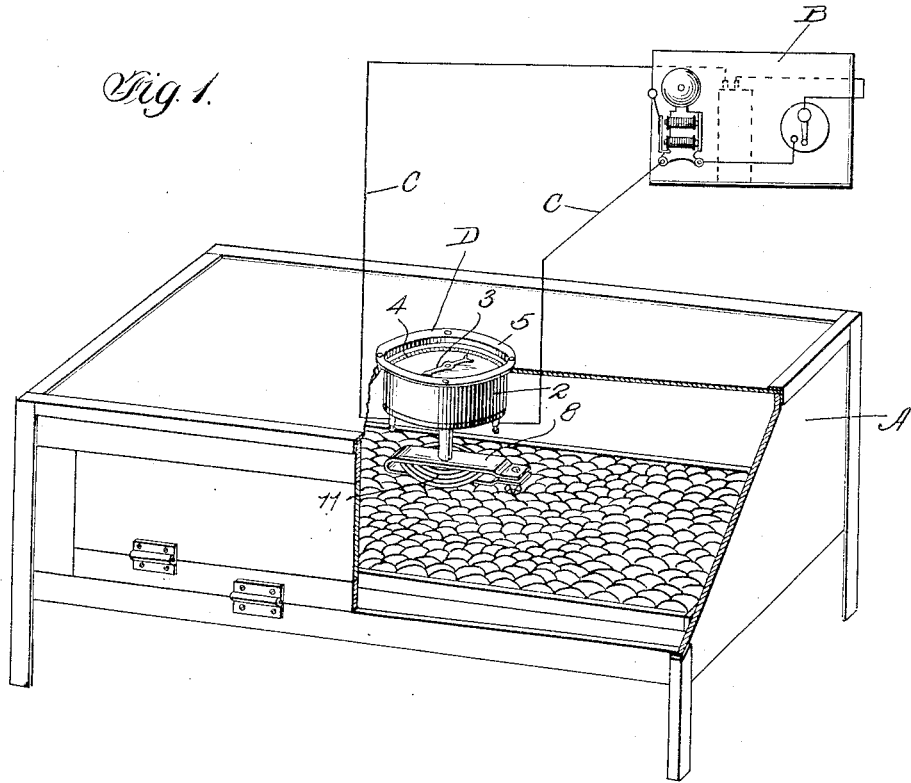
Figure 1 is perspective view of an incubator to which my invention is applied.
Figure 2:
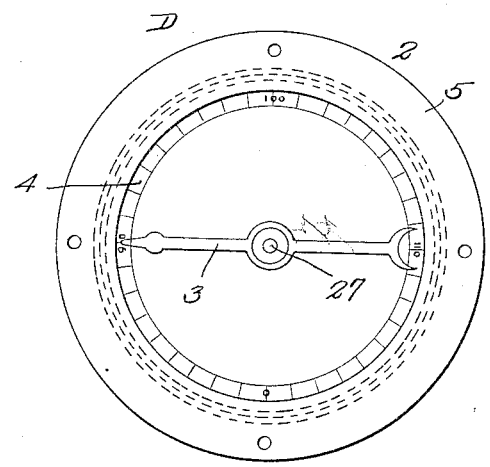
Fig. 2 is a plan view of an apparatus embodying my invention.

In the accompanying drawings A indicates an incubator, B an electric alarm, and C electric conductors connecting a thermostatic device D located within the chamber of the incubator with the alarm. The specific forms of the incubator and of the alarm apparatus have nothing to do with the present invention, nor has the relative location of these two devices, since the conductors C permit each to be set up wherever most desirable. The thermostatic device D has a casing 2 which is represented as being cylindrical in shape and provided with a flange 5, by which it is secured in the top of the incubator A, the casing being within the egg chamber of the incubator and hence subject to the temperature thereof, while the upper or exposed end of the casing lies in an opening in, and substantially flush with, the incubator top and is covered by a glass plate through which may be observed an index pointer 3 that is adapted to move over the face of a dial 4.

Secured to the bottom of the casing 2 and surrounding an opening 14 through the same, is a hollow boss or socket piece 6 into which is screwed the upper end of a tube 7, to the lower end of which is secured a supporting yoke 8 for the cell or wafer 11 of a thermostat. The supporting yoke has two arms 9, 9', connected by the curved part 10 which is quite thin, and highly elastic, as compared with the arms. The thermostatic cell is supported upon the lower arm 9' of the yoke and its upper or movable wall carries a cup 13 or seat in which rests the lower end of a rod 12 that passes up through the tube 7, the socket piece 6 and the opening 14 in the bottom of the casing. The free ends of the arms 9, 9' of the yoke are connected by a screw 15 on which is a nut 16, which serves as the adjusting means by which the position of the lower arm 9', and hence of the thermostatic cell 11 and the rod 12, may be accurately determined. The elastic portion 10 of the yoke tends to separate the free ends of the arms, so that when the nut is backed off the screw 15 the thermostat and rod move downwardly, and when the nut is screwed onto the rod these parts are elevated.

Within the casing 2 are mounted means for actuating the index pointer 3, and for moving a switch that controls the flow of current to the electric alarm B. The mechanism just referred to is supported in a frame consisting of a base piece 17 that rests upon the bottom of the casing, an upright 18 rising from the base, a bracket arm 19 extending from the upright, overlying the base and parallel therewith, and a flange 20 opposite to the upright 18 and preferably parallel therewith. In the flange 20 is mounted a screw 23 that serves as the adjustable bearing for one end of a shaft 21, the opposite end of which is supported, at 22, in the upright 18. The shaft 21 carries an arm 24 that overlies the end of the rod 12, which engages therewith and turns the shaft whenever the thermostatic cell expands to the proper extent, the engagement between the end of the rod and the arm 24 being controlled by the adjusting screw and nut, 15, 16.

A segmental gear 25 is secured to the shaft 21 and meshes with a pinion 26 secured to the shaft 27 that carries the pointer 3. This shaft is supported at its lower end in a bracket 28 and at its upper end in the bracket or arm 19. A spring 29 acts upon the shaft 27 in a manner to oppose the action of the rod 12 caused by the expansion of the thermostatic cell. The spring is represented as being coiled about the shaft 27, although it might be of other form and in a different location from that shown. The spring is important because the thermostat acts effectively only when the cell 11 is expanding, the opposite movements of the parts being insured by the spring. The shaft 21 also carries the movable arm 30 of a circuit closing switch. This arm is preferably formed of resilient metal and is of sufficient width, in the plane in which the arm moves, to give stiffness to the arm, while it is very thin in planes at right angles to its plane of movement, thus permitting the free end of the arm to be held against the contact surface with a light but uniform pressure.

At the outer end of the arm 30 is a contact roller 31. The surface over which this contact roller moves is supported by the upright 18 of the frame within the casing 2, and is preferably built up as follows: 32 indicates a piece of insulating material secured to the face of the upright wall 18. Against this insulating piece is placed a metal plate 33, preferably of copper, and covering the face of the metal plate 33 is a second insulating plate 34. It is against the latter that the roller 31 bears. The metal plate 33 is formed with a pair of spurs 36 which are preferably struck up from the metal of the plate and are integral therewith. These spurs extend through openings formed in the insulating plate 34, the ends of the spurs being finished so as to lie flush with the surface of the said plate.

35 indicates the screws employed to secure the plates 32, 33 and 34 to the upright 18. It will be understood that the assembly of these parts is such that the metallic plate is electrically insulated from all other conducting portions of the apparatus, except the electric connection 38 which is in the circuit including the conductors C and the signalling apparatus B. 37 indicates the other connection of the electric circuit which leads to the shaft 21 and arm 30 carrying the contact roller 31.

The operation of the apparatus is as follows: the parts being assembled as shown, when heat is applied to the incubator chamber the cell 11 of the thermostat expands, moving the rod 12 until it comes into engagement with the arm 24 and turns the shaft 21. The several parts of the apparatus are adjusted so that the index pointer 3 will move over the scale 4, which is marked to properly indicate the temperature within the incubator chamber. There are certain well recognized extremes of temperature which should not be exceeded, in either direction, in operating an incubator, as either too low a temperature or too high a temperature, if maintained for any considerable length of time, will prevent the proper incubation of the eggs. The contact spurs 36 are located in such positions that the roller 31 will engage with one of them when the lower extreme of temperature is reached, and with the other one when the high extreme of temperature is reached, with the result that a signal at the alarm apparatus B will be given whenever the temperature goes either above or below that range which is permissible for the proper working of the apparatus.

In order to prevent undue movement of the gear segment 25 and the shaft to which it is secured such as might permit the gear 25 and pinion 26 to get out of mesh, I provide some means for limiting the movements of the gear segment. For this purpose I have represented a curved stop 39 attached to the gear 25 and adapted to have its opposite ends alternately engage with the base piece 17 when the gear is moved to the respective limits of its permissible movement. Other forms of stop could be used for this purpose, but that shown is simple and convenient.

The apparatus described is simple in construction, which makes for cheapness of manufacture and assembly; is not liable to get out of adjustment nor cause frequent repair, and is reliable in operation.

What I claim is:

1. In a thermostatic apparatus, the combination of a thermostatic element, a U-shaped support therefor, having a pair of rigid arms connected by an intermediate elastic portion, one of which arms supports the thermostatic element, means for adjusting the arms toward and from each other, and a part arranged to be operated by the movable portion of the thermostatic element.

2. In a thermostatic apparatus, the combination of a thermostatic element, a U-shaped support therefor having a pair of rigid arms connected by an intermediate elastic portion, one of which arms supports the thermostatic element and the other of which is carried by a fixed support, means for adjusting the free ends of the arms toward and from each other, and a part arranged to be operated by the movable portion of the thermostatic element.

3. In a thermostatic apparatus, the combination of a thermostatic element, a U-shaped support therefor having a pair of rigid arms connected by an intermediate elastic portion, a rigid support to which one of the said arms is connected, the thermostatic element being supported by the other arm, and an adjusting device between the outer free ends of the arms by which the arm that carries the thermostatic element may be set, and a part arranged to be operated by the movable portion of the thermostatic element.

4. In a thermostatic apparatus, the combination of a thermostatic element, a U-shaped support therefor having a pair of rigid arms connected by an intermediate elastic curved portion, a hollow tube serving as a fixed support for the said U-shaped support, to which one of the arms thereof is secured, the other arm being free and supporting the thermostatic element, an adjusting screw uniting the free ends of the arms, and a rod that passes through the hollow supporting tube and has engagement with the thermostatic element so as to be moved thereby.

5. In a thermostatic apparatus, the combination of a closed casing, mechanism arranged therein, a hollow tube secured to the casing, a U-shaped support having a pair of rigid arms connected by an intermediate elastic portion, one of the arms being secured fast to the end of the hollow tube distant from the casing, an adjusting screw uniting the outer ends of the said arms, by which the free arm of the support may be adjusted and set, a thermostatic element located between the arms and supported by the free, adjustable arm, and a rod passing through the hollow tube, engaging with the thermostatic element so as to be moved thereby, and arranged to operate the mechanism within the casing.

6. The combination of a surface of insulating material, electric contacts which extend through the material of the said surface and are flush therewith, an arm carrying a roller adapted to move over the said surface and engage with the said electric contacts, the arm being elastic and holding the roller yieldingly against the said surface, a shaft by which the arm is carried, thermostatically operated means for actuating the shaft to move the arm in one direction, and spring actuated means tending to actuate the shaft in the opposite direction.

7. In a thermostatic apparatus for incubators a surface of insulating material, electric contacts extending through the material and flush with the surface thereof, an arm carrying an electric contact adapted to move over the said surface and engage with the electrical contacts referred to, the arm being of resilient material whereby it is elastic to hold the movable contact against the said surface and of sufficient width to give to it the necessary stiffness to impart accurate movements to the contact, a thermostatic device and connections between the thermostatic device and the said arm by which it is moved.

FRANK HICKOK.